United States Patent [19]
Wilcock

[11] Patent Number: 5,257,825
[45] Date of Patent: Nov. 2, 1993

[54] BARB AND SWIVEL SPOUT ELBOW FITTINGS

[76] Inventor: Anthony C. Wilcock, 13358 VBalley Vista Blvd., Sherman Oaks, Calif. 91423

[21] Appl. No.: 848,837

[22] Filed: Mar. 11, 1992

[51] Int. Cl.$^5$ .............................................. F16L 41/08
[52] U.S. Cl. .................................. 285/156; 285/273; 285/275; 285/354; 285/179; 411/395; 29/890.149; 29/890.14
[58] Field of Search ............... 285/275, 273, 272, 150, 285/151, 156, 354, 179, 281; 411/389, 395, 396; 29/890.141, 890.149, 558

[56] References Cited

U.S. PATENT DOCUMENTS

| | | | |
|---|---|---|---|
| 1,514,276 | 11/1924 | Whalen et al. | 285/272 X |
| 1,803,576 | 5/1931 | Weatherhead, Jr. | 285/156 X |
| 1,851,031 | 3/1932 | Baldwin, Jr. | 29/890.149 |
| 1,868,037 | 7/1932 | Weatherhead, Jr. | 29/890.149 |
| 2,220,216 | 11/1940 | Cloutier | 285/181 |
| 2,399,275 | 4/1946 | Wenk | 285/156 |
| 2,487,939 | 11/1949 | Norton | 285/156 X |
| 2,528,280 | 10/1950 | Lyon | 29/890.14 |
| 2,646,614 | 7/1953 | Staley | 29/890.14 |
| 2,674,786 | 4/1954 | Crawley | 285/179 X |
| 3,215,455 | 11/1965 | Fiala et al. | 285/150 X |
| 3,262,719 | 7/1966 | Gemma | 285/181 X |
| 3,488,069 | 1/1970 | Balon | 285/275 X |
| 3,844,148 | 10/1974 | Patel et al. | 285/341 X |
| 3,930,674 | 1/1976 | Jonsson | 285/272 X |
| 4,437,690 | 3/1984 | Drath | 285/272 |
| 4,674,998 | 6/1987 | Kozak, III | 285/354 X |
| 4,687,235 | 8/1987 | Stoll | 285/281 |
| 4,695,078 | 9/1987 | Anderson | 285/275 X |
| 4,712,809 | 12/1987 | Legris | 285/281 X |
| 4,893,846 | 1/1990 | McGraw | 285/156 |
| 5,083,589 | 1/1992 | Wilcock | 27/2 |
| 5,129,251 | 7/1992 | Takikawa | 72/334 |

FOREIGN PATENT DOCUMENTS

| | | | |
|---|---|---|---|
| 1237717 | 6/1960 | France | 29/890.149 |
| 0395113 | 7/1933 | United Kingdom | 29/890.149 |
| 2126303 | 3/1984 | United Kingdom | 285/275 |

*Primary Examiner*—Randolph A. Reese
*Assistant Examiner*—Heather Chun
*Attorney, Agent, or Firm*—William H. Maxwell

[57] ABSTRACT

An elbow fitting of selected member configurations and comprised of two members separately machined utilizing bar stock exterior form and one of which is cross drilled for assembly with the other and preferably adapted to rotatably receive a swivel spout sealed and secured therein, using less material, requiring less machining, and cost effective.

4 Claims, 2 Drawing Sheets

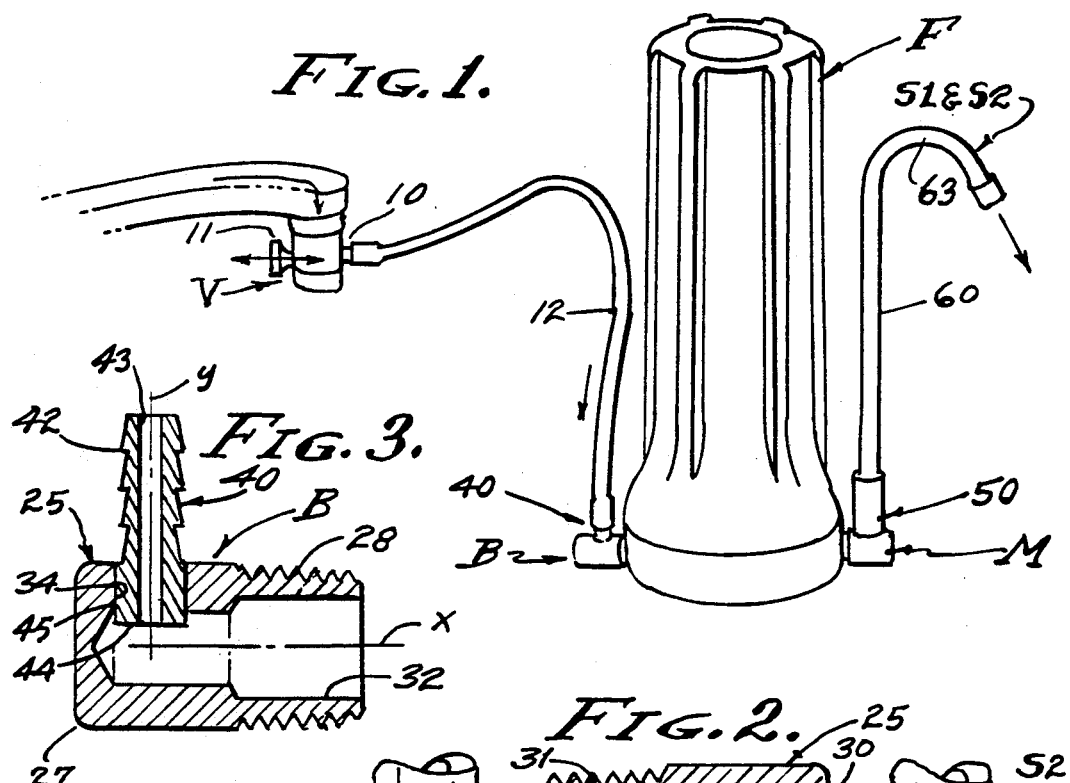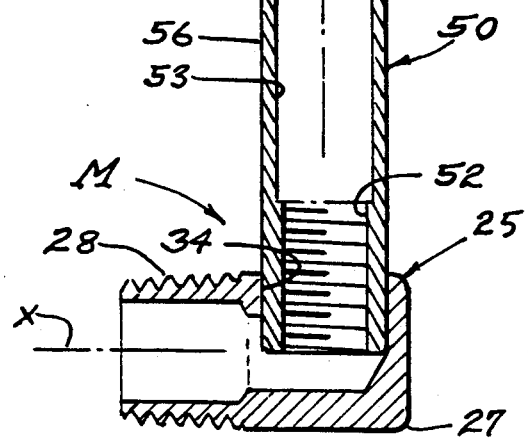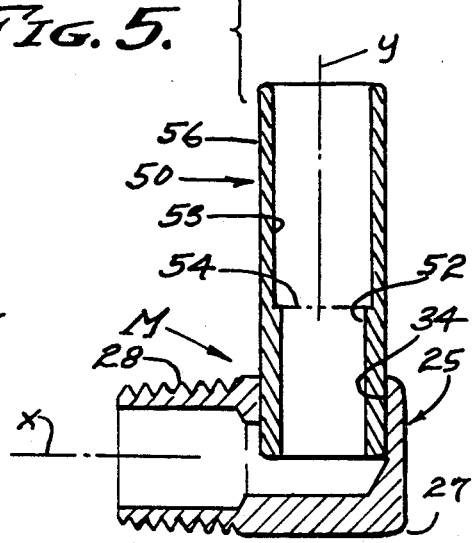

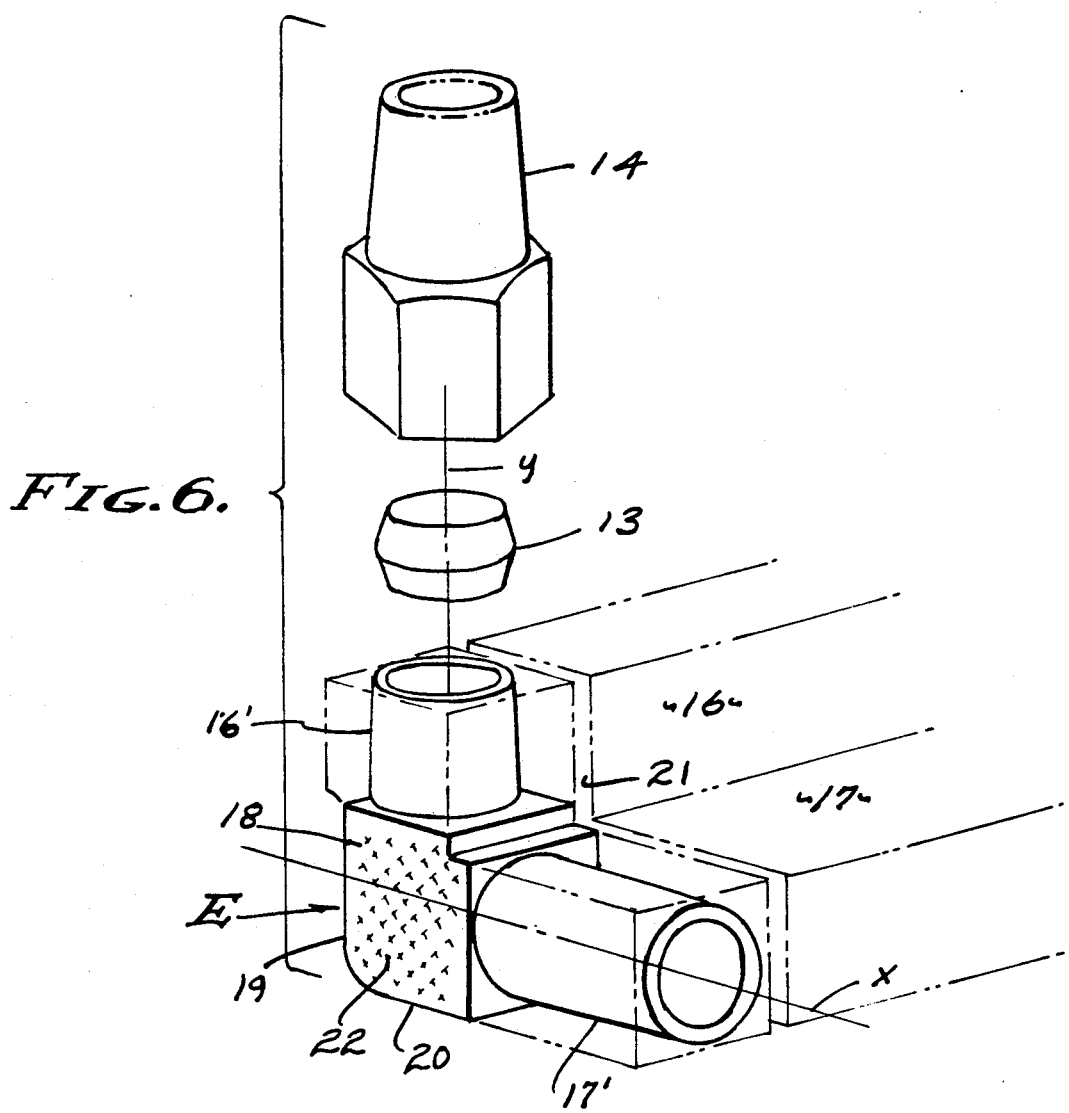
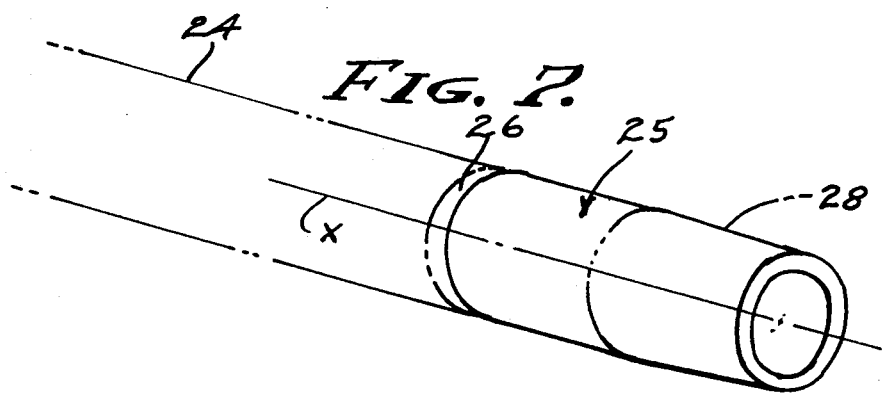

BARB AND SWIVEL SPOUT ELBOW FITTINGS

BACKGROUND OF THE INVENTION

This invention relates to a domestic elbow fitting used primarily to divert water through a filter unit or the like, it being a general object of this invention to provide a beautified cost effective double use elbow fitting base part. With the present disparity between domestic and foreign labor costs, it becomes extremely difficult for domestic manufacturers to be competitive when the product involved is labor intensive. Accordingly, it is an object of this invention to minimize the time involved in and/or to eliminate manufacturing steps that entail labor. Additionally, material cost is a most important factor, it being an object of this invention to employ inexpensive round bar stock that eliminates the need for exterior machining. Also, production machine tools employed with conventional collets are employed, rather than requiring special collets, as is the case with the prior art use of specially extruded bar stock cross sections.

Due to the growing unreliability of water supply systems, there is a growing market and need for domestic water filters, both under the counter and above the counter types. This invention is particularly concerned with the latter, with combined obectives to enhance appearance and to minimize unit cost.

Above the counter filters stand on the kitchen counter adjacent to the sink, and are connected to the faucet by means of a diverter valve; reference being made to my U.S. Pat. No. 5,083,589 entitled LOW COST RETURN DIVERTER VALVE issued Jan. 28, 1992. When this diverter valve is actuated, water is channeled through the filter by means of inlet and outlet elbow fittings and dispensed through a spout. The water inlet fitting is typically a barb fitting, while heretofore the outlet fitting has been a standard compression fitting. That is, these elbow fittings vary in purpose and are characterized by distinguishable features. Heretofore, the elbow fittings used for the purpose under consideration have been adaptations of standard prior art hydraulic fittings, which are basically designed for high pressure applications, with no attempt made toward beautification, except for plating them. These prior art elbow fittings are unecessarily designed to withstand pressures at and above 300 P.S.I., whereas the discharge pressure through this filter and spout combination is negligable.

The particular fittings under consideration are decorative barb elbows and spout elbows, which heretofore have been made from specially extruded brass stock of angular rectilinear cross sections (see FIG. 6). The angularly related ends of the prior art fittings require separate chuck and machine operations on standard equipment, or such operations combined into a multipurpose dedicated machine. This decorative fitting is either a barb elbow fitting or a swivel spout elbow fitting, characterized by an ornamental ¼ inch pipe thread part common to both configurations. The angular part of the barb elbow presents a 0.220 inch diameter barb to receive and anchor a water hose. And the angular part of the swivel spout elbow presents a right cylinder spout mount. Compression fittings are not used herein, since they cannot be swiveled when tightened, a decided disadvantage.

In accordance with this invention, the common base part of these elbow fittings is made from 9/16 inch diameter brass bar stock which is blind drilled, threaded and cut off, using for example an Acme Gridely Multi Spindle Screw Machine. The barb and spout mount members of the elbows are of rolled or extruded brass, and requires but two screw machine operations, the exterior barb configuration and the drilled interior. A blind cross hole is drilled into the base part for either the barb or for the spout mount, for example on a computer controlled Hardinge Chucker, and the two parts pressed into asssembled relation in the one machine set up.

In carrying out this invention, round bar stock is employed in order to eliminate exterior material waste, with a comensurate cost savings. Exterior machining and waste is thereby eliminated. And further, round bar stock is less expensive than specially extruded solid angular cross sectioned bar stock, and renders an oramental part.

A return diverter valve is employed, as shown, to direct faucet water through a filter unit and from a swiveled discharge spout. It is the filter base which is used to mount the barb elbow fitting connected by a hose from the diverter valve on the kitchen sink faucet and to mount the spout elbow for filtered water discharge. A manual valve control is accessible at one side of the diverter valve.

It is an object of this invention to provide a cost effective and ornamental elbow fitting having the features of either a barb inlet water fitting or a spout mount water outlet fitting. In carrying out this invention, the unsightly utilitarian appearance of standard prior art elbow fittings is replaced with unique and improved elbow fittings of enhanced ornamental value.

SUMMARY OF THE INVENTION

This invention resides in the unique configuration of either of two press fitted elbow fittings, for directing the flow of water, for example through a filter unit or the like. Heretofore, such elbow fittings have been unsightly and of labor intensive configuration "hogged", so to speak, from solid angular cross sectioned bar stock which is considerably more expensive than common round bar stock. A feature is the elimination of exterior machining, with decorative plating applied directly to the bar as supplied. Accordingly, this invention provides a selected two part assembly, either a barb elbow fitting or a spout mount elbow fitting, whereby the finished product is cost effective in the use of a common part. The press fit assembly in a single machine tool set up is unique and very cost effective.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a view showing the installation of a barb elbow B and a swivel spout elbow M on a filter unit for discharing filtered water from a faucet.

FIG. 2 is a detailed sectional view of the common base member that characterizes this invention.

FIG. 3 is a detailed sectional view of the barb elbow B assembly.

FIG. 4 is a detailed sectional view of a first embodiment swivel spout M assembly and threaded mount member therefor.

FIG. 5 is a detailed sectional view of a second embodiment swivel spout M and friction mount member therefor.

FIG. 6 is an exploded perspective view showing the prior art elbow and its mode of manufacture.

And, FIG. 7 is a perspective view showing the common base member of the present invention and its mode of manufacture.

PREFERRED EMBODIMENT

Referring now to the drawings, a practical application of these elbow fittings is shown in FIG. 1, wherein inlet and outlet elbow fittings are screw threaded into a filter body and connected to a water faucet from which water normally flows when a diverter valve V is opened. The diverter valve V includes a barb fitting 10 carried by a filter screen unit in which the diverter valve is incorporated, with a manually operable control knob 11 accessible at one side. The barb fitting 10 is connected to the inlet barb elbow fitting B on the filter unit F by a hose 12, and filtered water discharge is from the outlet spout mount elbow fitting M on the base of the filter unit F. As shown in the drawings, the base members of the elbow fittings B and M are ornamental right cylinder elements screw threaded into the base of the filter unit. A pipe thread is employed. In combination with the base of the elbow fitting B there is a barb member 40 press fitted therewith to project laterally (vertically as shown). In combination with the base of the elbow fitting M there is a selection of two spouts S1 and S2. Accordingly, faucet water diverted by the valve V through hose 12 is discharged from a spout S1 or S2, as will be described.

A standard compression fitting elbow E, its method of manufacture, and its required mating components, a ferrule 13 and nut 14, are snown in FIG. 6. These prior art elbow fittings, which may be pipe to pipe thread, compression to compression thread, or the combination pipe to compression type shown, are machined from specially extruded bar stock. This bar stock typically of "L" shaped cross section, having two legs 16 and 17 and each dimensioned to provide material sufficient to turn the threaded ends, as shown. The prior art elbow is characterized by its ultilitarion body 18 having right angularly related outer sides 19 and 20 joined by a corner radius; these features being provided by the extruded bar stock. Each body 18 with its two legs 16 and 17 is separated from the bar stock by means of a cut-off or saw operation at 21, which produces substantial waste material. The body 18 is then held in a special chuck or collet (not shown) and the two legs drilled, turned and threaded at 16' and 17' on axes x and y, again producing substantial waste material (significantly from the exterior). The cut-off and chucking operations are detrimental, in that they leave permanent saw marks and jaw indentations 22 (as shown) removed only at considerable expense.

The standard prior art compression elbow E hereinabove described in only useful in combination with a ferrule 13 and nut 14, in order to connect to a discharge spout or the like. And, when the nut is tightened the spout connected thereby is immovable and cannot be swiveled.

Referring now to FIG. 7 of the drawings, the elbow fittings B and M of the present invention include a base member 25 of right cylinder configuration turned on axis x and cut off of rolled bar stock 24. The bar stock 24 is advantageously fed through the spindle of the aforementioned machine tool and cut off at 26 with a form cutter to provide a radius at 27. The collet grip on the bar stock does not scar the exterior surface thereof, and there is no exterior removal of material, except for that involved in cutting the connector portion pipe threads 28. The cut-off area of this bar stock is approximately one fourth that of the above described standard compression elbow (compare FIGS. 6 and 7).

The base member 25 of right cylinder configuration is shown in FIG. 2, blind drilled at 29 leaving an imperforate end wall 30. An inner connector portion 31 is counterbored at 32, and a projecting outer portion 33 of greater wall thickness remains of right cylinder form. It is this heavier outer portion 33 that is machined and through which either a barb member 40 or a spout mount member 50 is installed, as later described. A feature of this invention is the base member 25 shown in FIG. 2, which member is common to the barb elbow fitting B of FIG. 3 and to the spout mount elbow fitting M of FIGS. 4 or 5.

In accordance with this invention, the base member 25 is advantageously assembled with a selected lateral member of any desired configuration. In the ultilitarian situation here under consideration the lateral members are the barb member 40 (FIG. 3) and the spout mount member 50 (FIGS. 4-5). Members 40 and 50 are assembled with the base members 25 in one machine set-up, wherein the base member is sequentially cross drilled at 34 through one side wall of portion 33 and the member 40 or 50 press fitted therein. This sequential set-up of operations is economically carried out in the aforementioned Hardinge machine tool that is computer controlled to sequentially blind drill and shift the barb and/or spout mount members into press-fitted position, thereby producing completed elbow fittings.

The barb member 40 of round configuration is best illustrated in FIG. 3 where it is shown comprised of a turned part press fitted on axis y into a cross drilled bore 34 in the base member 25. In practice, the barb member 40 is machined of bar stock fed through a collet of an automatic screw machine, where its exterior is shaped with barbs 42, as by means of a form cutter, through drilled at 43 and cut off at 44, providing opposite ends of a finished part. This finished part has a base diameter 45 (stock diameter) that is approximately one half the base 25 diameter, and press fitted into the bore 34 as indicated.

The spout mount member 50 is best illustrated in FIGS. 4 and 5 where it is shown comprised of a turned part press fitted on axis y into a cross drilled bore 34 in the base member 25. In practice, the spout mount member 50 is machined of bar stock fed through a collet of an automatic screw machine, where its interior only is through drilled and counterbored at 53 to provide a stop shoulder 54 and to provide wall thickness for threads 52. The finished part is of exterior right cylinder form having a coextensive outer diameter 56 (stock diameter) that is approximately three fourths that of the base 25 diameter, and press fitted into the bore 34 as indicated.

The water discharge spout S1 shown in FIG. 4 is a round tubular part with a straight upstanding portion 60 slidably and rotatably inserted into the counterbore 53 of the mount member 50, and with a lower portion 61 threaded to be engaged into the threads 52. An "O" ring seal 62 is carried by the spout immediately above the threaded portion thereof and within the counterbore 53, to rotatably seal the spout captured in position by the threaded connection. Thus, the spout S1 is sealed and permitted to swivel, the upper portion 63 being turned downwardly for water discharge.

The water discharge spout S2 shown in FIG. 5 is a round tubular part 60 slidably and rotatably inserted into the counterbore 53 of the spout mount member 50, and with its lower portion 61' stopped by the shoulder 54, provided by the un-threaded through drilling. At least one and preferably spaced "0" ring seals 66 are carried by the spout and within the conterbore 53 to rotatably seal the spout S2 frictionally held in position by the seals. The frictional engagement of the spout seals eliminates the need for the threads 52 as shown in FIG. 5. Thus, the spout S2 is sealed and permitted to swivel, the upper portion 63 being turned downwardly for water discharge.

From the foregoing it will be understood that bar stock is advantageously employed to produce cost effective elbow members, one of which is a base member common to any one of number of elbow configurations. A feature is the cross drilling of a blind bore through the side wall of the base member, a feature which enables a single set-up in a computer controlled machine tool that sequentially drills and installs a lateral member press fitting the combination of parts. The connector threads and special configurations can vary as required, the spout mount adaptation being characteristic of this invention. By employing rolled or extruded bar stock of round form, the exterior form of the finished product is established. And, by employing collet chucking there are virtually no scar marks, whereby plating is directly applied, resulting in anhunblemished article.

Having described only the typical preferred forms an applications of my invention, I do not wish to be limited or restricted to the specific details herein set forth, but wish to reserve to myself any modifications or variations that may appear to those skilled in the art as set forth within the limits of the following claims.

I claim:

1. A swivel spout mount elbow fitting comprised of a base member and a lateral spoutmount member separately machined on central axes;

the base member being of right cylinder configuration blind drilled with an imperforate side wall having a projecting outer portion with an end wall and continuing from an externally threaded and open inner connector portion, and the lateral member being of round configuration through drilled for flow therethrough and with a threaded counterbore and with an outer diameter, the projecting outer portion of the base member being cross drilled with a bore through said side wall, and said outer diameter of the lateral member being fitted into said bore and through drilled with a lower thread portion and a counterbore to rotatably receive a tubular discharge spout inserted therein with its lower portion rotatably screw threaded into said lower threaded portion of the lateral member for flow therethrough and from the base member.

2. The swivel spout elbow fitting comprised of the two members as set forth in claim 1, wherein a seal is carried between the tubular discharge spout and the counterbore into which it is inserted.

3. A swivel spout mount elbow fitting comprised of a base member and a lateral spout mount member separately machined on central axes;

the base member being of right cylinder configuration blind drilled with an imperforate side wall having a projecting outer portion with an end wall and continuing from an externally threaded and open inner connector portion, and the lateral member being of round configuration through drilled for flow therethrough and with a counterbore and with an outer diameter, the projecting outer portion of the base member being cross drilled with a bore through said side wall, and said outer diameter of the lateral member being fitted into said bore and through drilled with a lower portion and a stepped counterbore to rotatably receive and position a tubular discharge spout inserted therein with its lower end rotatable against a step formed by said counterbore for flow therethrough and from the base member.

4. The swivel spout elbow fitting comprised of the two members as set forth in claim 3, wherein at least one frictional seal is carried between the tubular discharge spout and counterbore into which it is inserted to seal and secure the spout in rotatable position.

* * * * *